United States Patent
Chikuan et al.

(10) Patent No.: US 6,678,164 B2
(45) Date of Patent: Jan. 13, 2004

(54) PRESSURE SENSOR AND METHOD FOR MANUFACTURING THE SAME

(75) Inventors: Kenji Chikuan, Kariya (JP); Michitake Kuroda, Ama-gun (JP); Haruhiko Miyagawa, Chiryu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/374,092

(22) Filed: Feb. 27, 2003

(65) Prior Publication Data

US 2003/0184982 A1 Oct. 2, 2003

(30) Foreign Application Priority Data

Mar. 29, 2002 (JP) .................................... 2002-093927

(51) Int. Cl.[7] .............................. H05K 5/00; H05K 5/04; H05K 5/06
(52) U.S. Cl. ...................... 361/752; 361/753; 361/796; 361/791; 73/718; 73/756; 73/724; 73/706
(58) Field of Search ................................ 361/752, 753, 361/796, 791; 73/718, 756, 724, 706

(56) References Cited

U.S. PATENT DOCUMENTS

| | | | |
|---|---|---|---|
| 5,595,939 A | | 1/1997 | Otake et al. |
| 5,670,722 A | * | 9/1997 | Moser et al. ................. 73/756 |
| 5,929,754 A | * | 7/1999 | Park et al. ................... 340/439 |
| 5,932,808 A | * | 8/1999 | Hayashi et al. ............... 73/724 |
| 6,122,973 A | * | 9/2000 | Nomura et al. ............... 73/724 |
| 6,227,055 B1 | * | 5/2001 | Pitzer .......................... 73/715 |

* cited by examiner

Primary Examiner—David Martin
Assistant Examiner—Thanh Yen Tran
(74) Attorney, Agent, or Firm—Posz & Bethards, PLC (57) ABSTRACT

In a pressure sensor, a sensor element is mounted on a side of a first surface of a first case, and a second case having a cylindrical hollow portion is bonded to the first case to cover a part of a second surface of the first case, opposite to the first surface. Terminals are embedded in the first case to protrude from the second surface, and branch portions are branched from the terminals from an embedded portion in the first case to have exposed portions exposed to the second surface. A chip capacitor is mounted on the exposed portions on the second surface to be electrically connected to the exposed portions. In the pressure sensor, a diameter (D1) of the second surface of the first case is larger than an inner diameter (D2) of the hollow portion at a position where protrusion top ends of the terminals are positioned.

6 Claims, 8 Drawing Sheets

PRESSURE SENSOR AND METHOD FOR MANUFACTURING THE SAME

CROSS REFERENCE TO RELATED APPLICATION

This application is based on Japanese Patent Application No. 2002-93927 filed on Mar. 29, 2002, the disclosure of which is incorporated herein by reference.

BACKGROUND OF THE INVENTION

1. Field of the Invention

The present invention relates to a pressure sensor including a sensor element that is disposed in a case having terminals for electrically connecting the sensor element to an outside. More particularly, the pressure sensor includes a capacitor for improving resistance to electromagnetic compatibility (EMC).

2. Related Art

A pressure sensor described in JP-A-7-243926 includes a sensor element for detecting a pressure, and a case for accommodating the sensor element. The case has therein plural terminals for electrically connecting the sensor element to an outside. However, in the pressure sensor, noise electrical current is readily applied to the sensor element due to irradiation of an electromagnetic wave, and the sensor element performs an error operation. That is, the resistance to the EMC is reduced.

To overcome this problem, a capacitor for restricting the noise current is generally assembled to a circuit of a semiconductor chip for constructing the sensor element. However, in this case, the size of the sensor element with the capacitor is increased for improving the restricting effect of the noise current.

Figure 10:
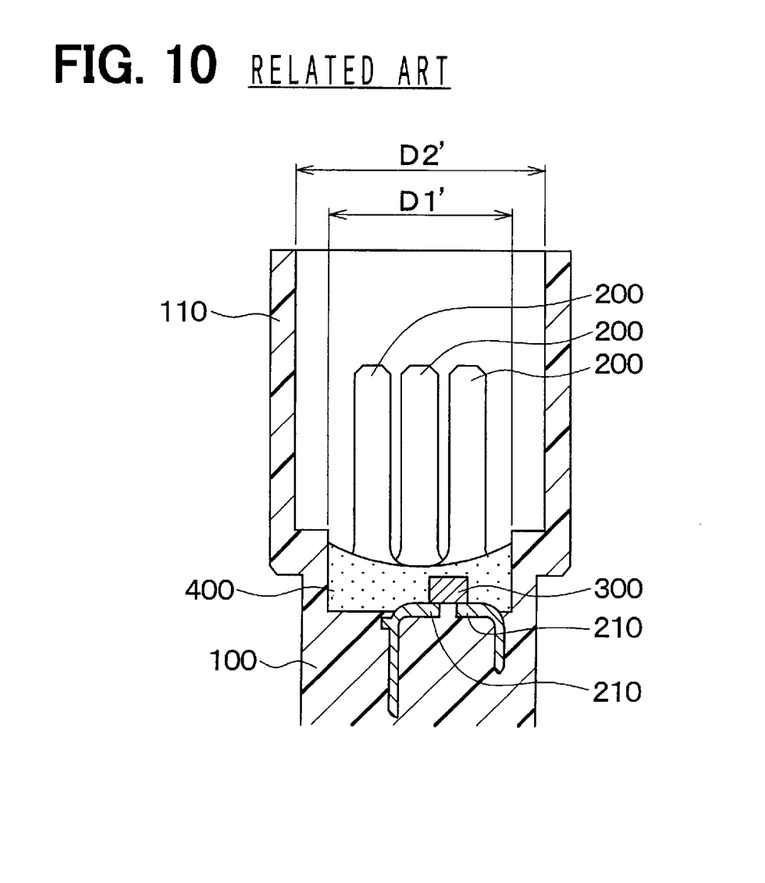
FIG. 10 is a schematic sectional view showing a pressure sensor in a related art.

On the other hand, the capacitor for releasing the noise current may be disposed at a position except for the capacitor. For example, as shown in FIG. 10, terminals 200 are insert-molded to be embedded and fixed in a case 100 while the case 100 is integrally molded by using resin. The terminals 200 protrude to one end side in the case 100, at a position in a connector portion 110 of the case 100. The connector portion 110 has therein a hollow portion, and protrusion top ends of the terminals 200 are electrically connected to an outside through the connector portion 110. A sensor element (not shown) is mounted on the other end side in the case 100, and is electrically connected to the terminals 200 by wire-bonding.

Further, branch portions 210 branched from the terminals 200 are provided in the case 100. A capacitor 300 is provided at a portion where the branch portions 210 are exposed from the one end side of the case 100, so that the terminals 200 are electrically connected. The capacitor 300 is closed by a potting resin 400 to be sealed therein. However, in the pressure sensor, a diameter D1' of one end surface of the case 100, for mounting the capacitor 300, is smaller than an inner diameter D2' of the connector portion 110. Accordingly, when the capacity of the capacitor 300 is increased in order to improve the resistance to EMC, the capacitor 300 is difficult to be mounted. Generally, the size and the shape of the connector portion 110 are liminated for connecting with an outside connector. Thus, in the integrally molded case 100, it is difficult to increase the capacitor mounting area independently from the connector portion 110.

SUMMARY OF THE INVENTION

In view of the above-described problems, it is an object of the present invention to provide a pressure sensor that includes a sensor element and a case having therein a terminal for connecting the sensor element to an outside. In the pressure sensor, a capacitor having a large capacity is readily suitably assembled to the case.

It is another object of the present invention to provide a method for manufacturing the pressure sensor.

According to the present invention, a pressure sensor includes a first case having a first surface and a second surface opposite to the first surface, a sensor element disposed in the first case on a side of the first surface for detecting pressure, a terminal embedded in the first case to be fixed in the first case, a second case having an inner wall surface defining an approximate cylindrical hollow portion, and a capacitor for restricting a noise current applied to the sensor element. The second case is bonded to the first case to have a cover surface that cover at least a part of the second surface of the first case, and the terminal is electrically connected to the sensor element and an outside. Further, the terminal includes an extending portion extending in an axial direction in which the first case and the second case are connected, and the extending portion of the terminal protrudes from the second surface of the first case into the hollow portion of the second case in the axial direction to have a protrusion end being electrically connected to the outside. In addition, the terminal includes a branch portion branched from the extending portion and embedded in the first case, a part of the branch portion is exposed to the second surface to form an exposed portion, and the capacitor is disposed on the exposed portion to be electrically connected to the exposed portion. In the pressure sensor, the second surface in the first case has a radial dimension that is larger than a radial dimension of the hollow portion at a predetermined position where the top end of the extending portion of the terminal is positioned. Because the second surface of the first case is used as an actual mounting surface for mounting the capacitor, the capacitor having a large capacity (size) can be readily suitably disposed in the pressure sensor.

Alternatively, at least a part of the exposed portion is positioned at a radial outside of the radial dimension of the hollow portion at the predetermined position. Therefore, the actual mounting surface for mounting the capacitor can be readily provided, regardless of the shape or the size of the hollow portion of the second case.

According to the present invention, by assembling the first and second cases, the second surface of the first case, which is used as an actual mounting surface for mounting the capacitor, can be formed separately from the hollow portion of the second case, which is used as a connector portion. Therefore, the second surface of the first case can be readily formed larger regardless of the size or the shape of the second case with the connector portion. Thus, it is possible to form the radial dimension of the second surface of the first case to be larger than the radial dimension of the hollow portion of the second case at the predetermined position, and it is also possible for at least a part of the exposed portion to be positioned radial outside of the radial dimension of the hollow portion at the predetermined position. As a result, in the pressure sensor, the second surface of the first case can be independently suitably set regardless of the size and the shape of the second case with the connector portion. Therefore, the capacity of the capacitor can be readily suitably changed in accordance with a necessity.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Figure 1:
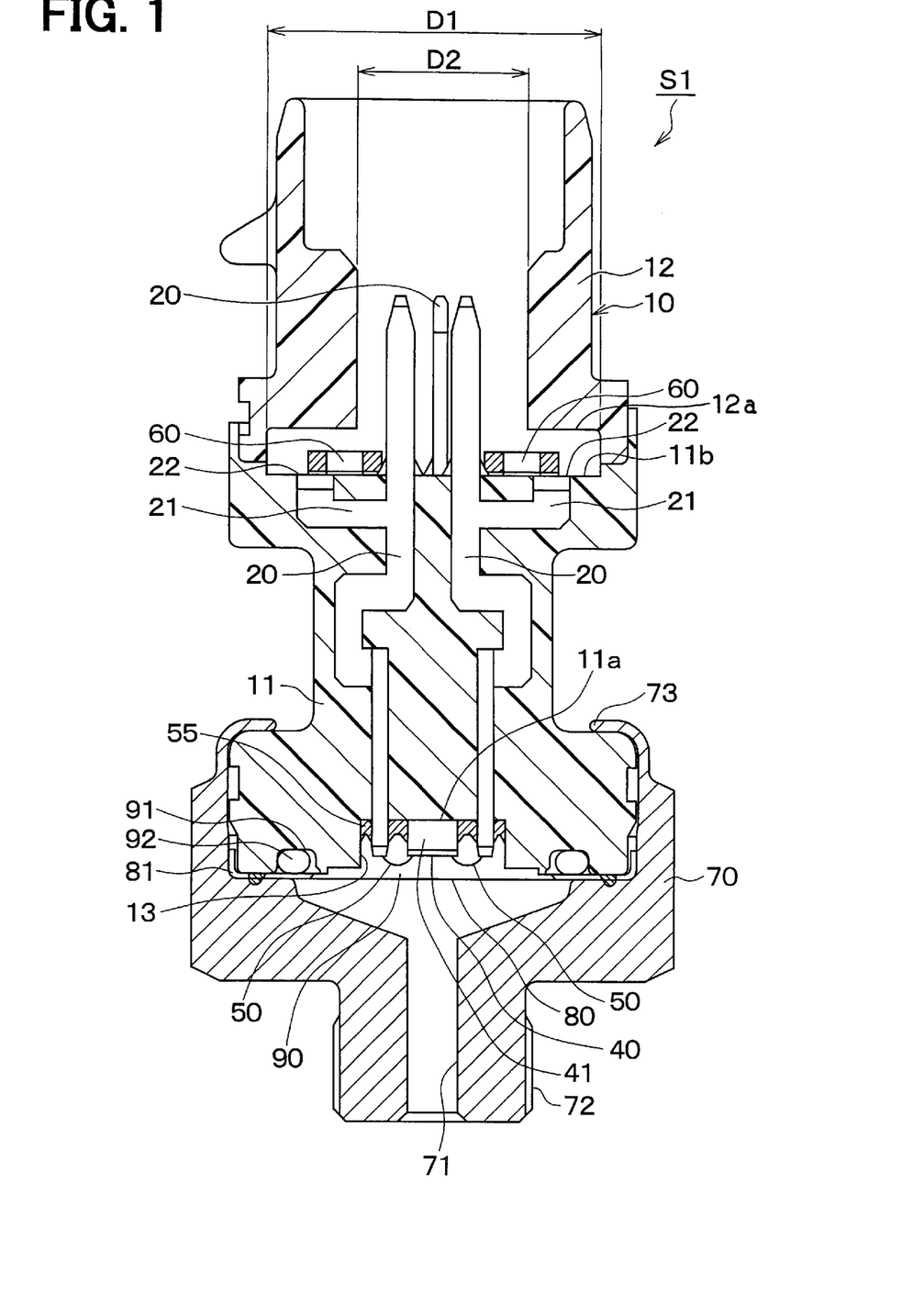
FIG. 1 is a schematic sectional view showing a pressure sensor according to a preferred embodiment of the present invention.

A preferred embodiment of the present invention will be now described with reference to the accompanying drawings. In the present embodiment, a pressure sensor S1 shown in FIG. 1 is typically used for detecting pressure of refrigerant in an air conditioner mounted on a vehicle, for example.

Figure 2:
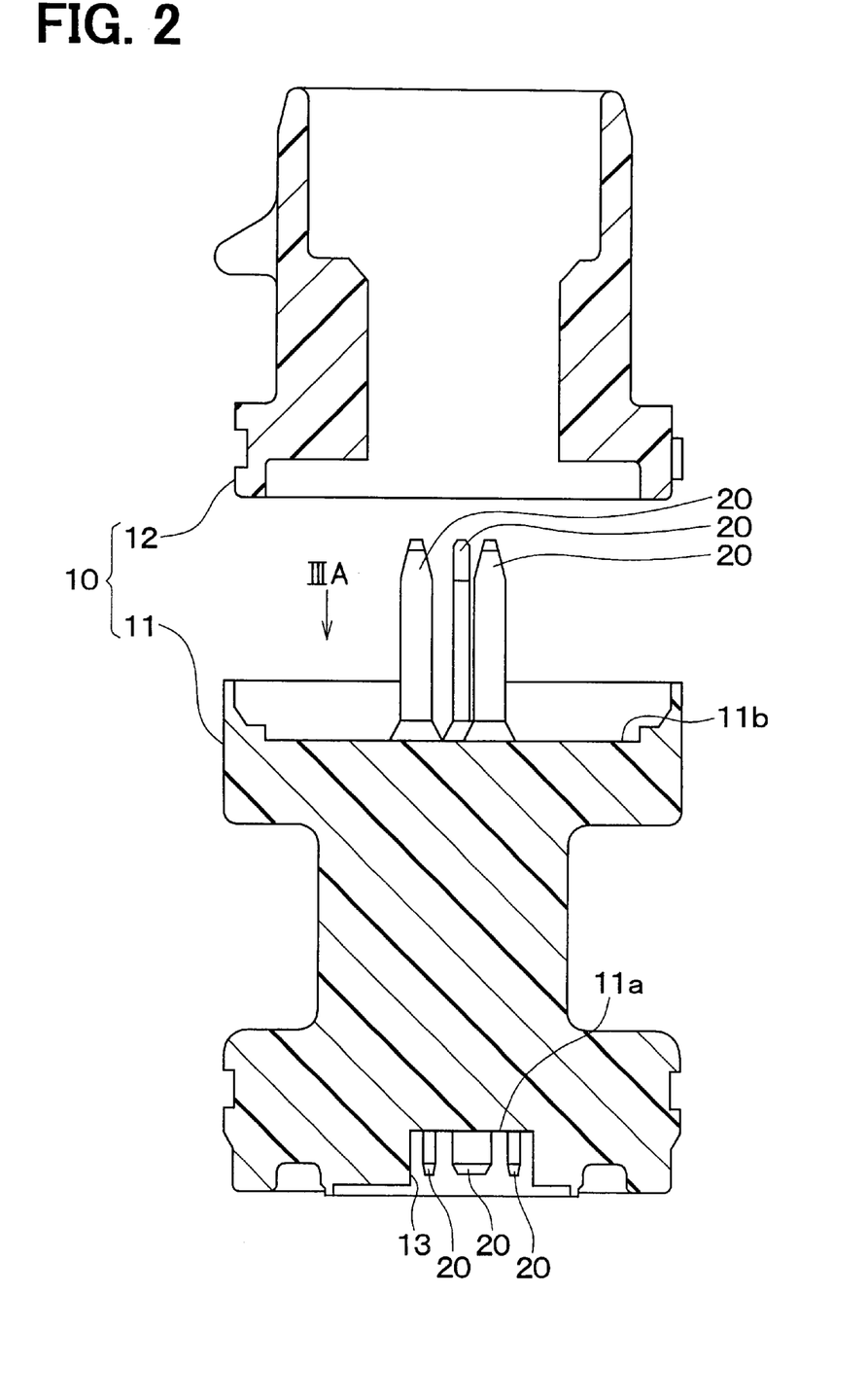
FIG. 2 is a sectional view showing divided first and second cases of the pressure sensor.

The pressure sensor S1 includes a case member 10 shown in FIG. 2. FIG. 2 shows a division state of the case member 10 that is divided into a first case 11 and a second case 12. As shown in FIGS. 1 and 2, the case member 10 is constructed by assembling the first case 11 and the second case 12. Each of the first case 11 and the second case 12 is integrally molded by one step mold using a resin such as polyphenylene sulfide (PPS) or polybutylene terephthalate (PBT).

The first case 11 is formed into an approximate cylinder shape having step portions. A recess portion 13 is provided in a one end of the first case 11 to be recessed from the one end of the first case 11. A sensor element 40 for detecting pressure is disposed in the recess portion 13. The recess portion 13 has a bottom surface that is used as a first surface 11a. The first case 11 has a second surface 11b at a side opposite to the first surface 11a.

Figure 3A:
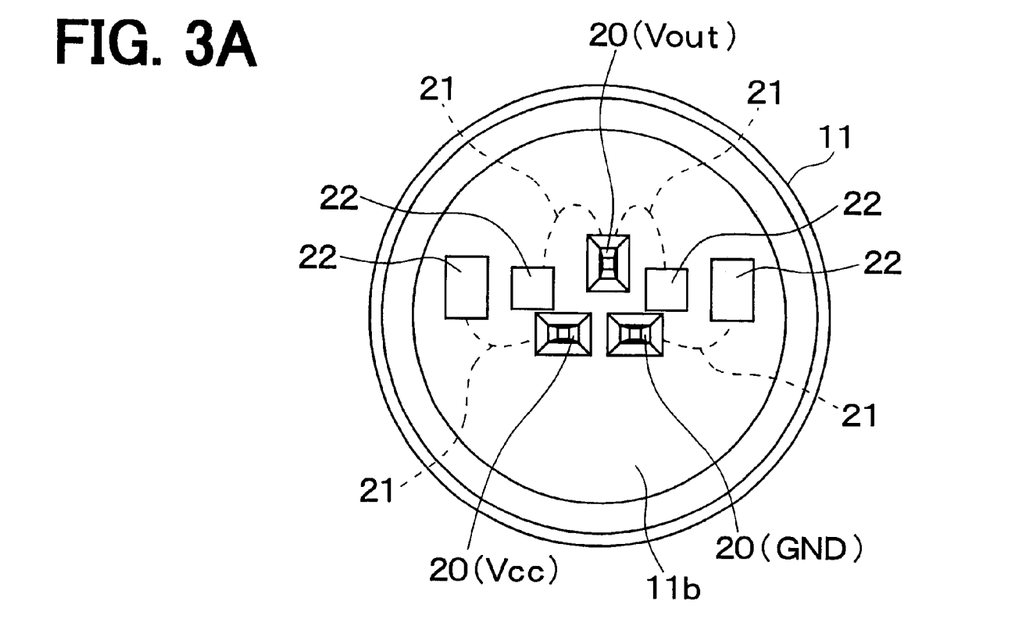
FIG. 3A is a diagram when being viewed from arrow IIIA in FIG. 2.

Terminals 20 made of a conductive material such as metal are embedded in the first case 11. For example, in this embodiment, three terminals 20 are provided. The terminals 20 are disposed to penetrate through the first case 11 in an axial direction of the first case 11. One end of each terminal 20 protrudes from the first surface 11a, and the other end of each terminal 20 protrudes from the second surface 11b. In this embodiment, the three terminals 20 are a terminal for an input signal Vcc of the sensor element 40, a terminal for an output signal Vout of the sensor element 40, and a terminal for ground GND (earth). As shown in FIGS. 3A and 4B, the three terminals 20 are provided separately from each other for the input signal Vcc, the output signal Vout and the ground GND.

As shown in FIG. 1, one side ends of the terminals 20 are electrically connected to the sensor element 40 by a wire 50 in the recess portion 13 of the first case 11. The wire 50 is formed by wire-bonding of gold or an aluminum material, for example. Base portions of the terminals 20 protruding into the recess portion 13 are sealed by a seal material 55 made of a silicon rubber.

The sensor element 40 converts an applied pressure to an electrical signal, and output the electrical signal as a sensor signal. The sensor element 40 can be constructed of a semiconductor diaphragm type having a diaphragm for receiving a pressure. In this case, the diaphragm provided in a silicon semiconductor board is integrated to the base plate 41 by an anode bonding. Then, the base plate 41 integrated to the sensor element 40 is bonded to the bottom surface (i.e., the first surface 11a) of the recess 13.

Figure 3B:
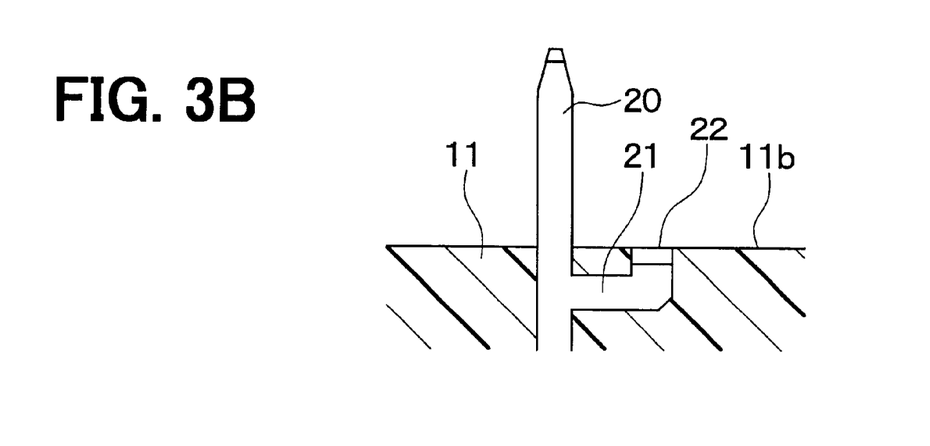
FIG. 3B is a sectional view showing an embedded state of a terminal embedded and fixed in the first case.

The other ends of the terminals 20 protrude from the second surface 11b of the first case 11, and the protruded ends of the terminals 20 are provided to be connectable to an outer connector. As shown in FIGS. 1, 3A and 3B, branch portions 21 are formed in the terminals 20, to be branched from embedded portions of the terminals 20, embedded in the first case 11. The branch portions 21 are branched from the terminals 20 at branched base portions that are embedded in the first case 11 to be fixed therein. A part of the branch portions 21 is exposed to the second surface 11b of the first case 11 to have exposed portions 22. For example, in this embodiment, the exposed portions 22 are the ends of the branch portions 21. In FIGS. 3A and 4B, the other portions of the branch portions 21, except for the exposed portions 22, are shown by the chain lines.

Figure 4A:
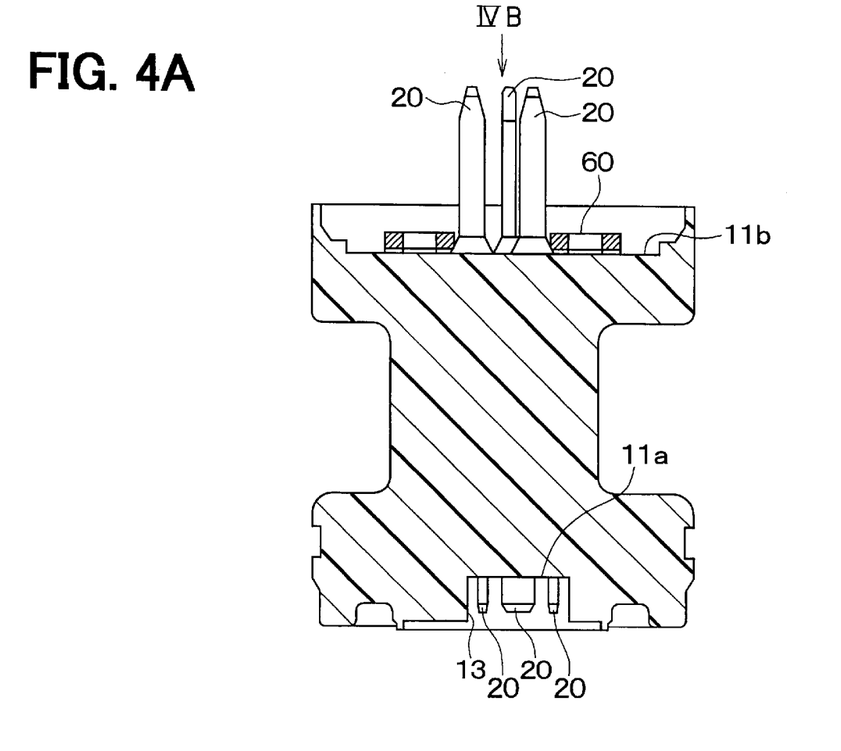
FIG. 4A is a sectional view showing a mounting state of a chip capacitor in the first case.
Figure 4B:
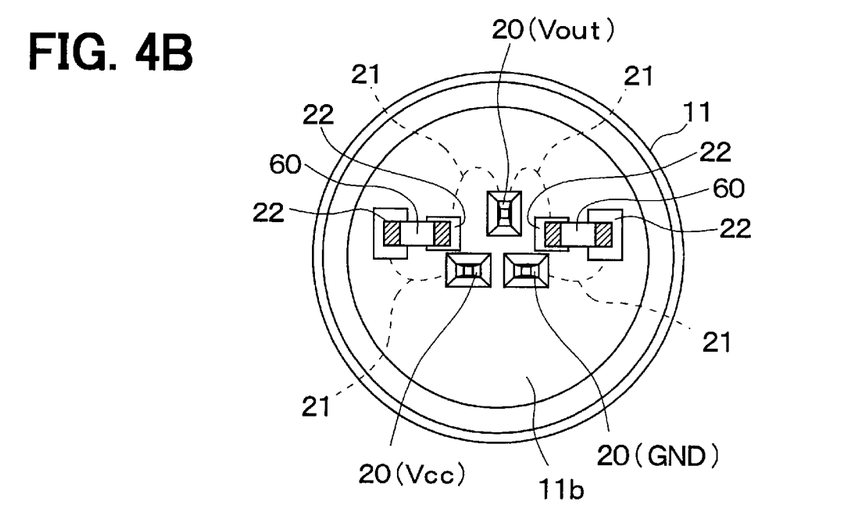
FIG. 4B is a diagram when being viewed from arrow IVB in FIG. 4A.

As shown in FIGS. 1, 4A and 4B, a chip capacitor 60, for releasing a noise electrical current applied to the sensor element 40, is mounted on the exposed portions 22 of the branch portions 21, on the second surface 11b of the first case 11. The chip capacitor 60 is electrically connected to the exposed portion 22 by using a conductive connection member such as an Ag paste or a solder. In this embodiment, two chip capacitors 60 are provided. Each of the chip capacitors 60 is provided to connect two exposed portions 22. As shown in FIG. 4B, the two chip capacitors 60 are mounted while using the terminal 20 for the output signal Vout in common.

As described above, the sensor element 40 is mounted in the first case 11, and the terminals 20 are provided in the first case 11 to be fixed in the first case 11. The first case 11 is molded integrally. In addition, the branch portions 21 branched from the terminals 20 are embedded in the first case 11 to be fixed in the first case 11.

The other end of the first case 11 is bonded to the second case 12. The second case 12 is formed into an approximate cylindrical shape, and is used actually as a connector for performing a connection to an outside. The second case 12 has therein a hollow portion, and the other ends of the terminals 20 protrude and extend into the hollow portion of the second case 12.

The second case 12 is disposed to cover at least a part of the second surface 11b of the first case 11. Therefore, an exposed area of the chip capacitor 60 to the outside can be reduced, and affect to the chip capacitor 60 due to introduction of debris can be restricted.

As shown in FIG. 1, the diameter D1 of the second surface 11b in the first case 11 is a diameter of a mounting surface on which the chip capacitor 60 is mounted. As shown in FIG. 1, the diameter D1 of the second surface 11b of the first case 11 is set larger than an inner diameter D2 of the connector portion of the second case 12, connected to the outside.

Further, as shown in FIG. 1, a housing 70 is assembled to the one end side of the first case 11. The housing 70 is formed into a cylindrical shape with a step portion. For example, the housing 70 is made of a steel material such as plated carbon steel. The housing 70 has therein a pressure introduction passage 71 through which refrigerant from a refrigerant pipe of a vehicle air conditioner is introduced. A screw portion 72 is provided on the housing 70, so that the pressure sensor S1 can be fixed to the refrigerant pipe of the air conditioner.

A metal diaphragm 80 is formed from a thin metal such as stainless steel, and is provided in the housing 70 at a side of the first case 11 to air-tightly cover the opening of the pressure introduction passage 71. The metal diaphragm 80 is welded to an inner peripheral surface of the housing 70 through a pressing member (ring weld) 81, to be air-tightly bonded to the housing 70.

An end portion 73 of the housing 70, at the side of the first case 11 is bent to fasten the first case 11 at the one end side of the first case 11, so that the housing 70 is fixed to the first case 11. In the assembled first case 11 and the housing 70, a pressure detecting chamber 90 is defined between the first case 11 and the metal diaphragm 80.

An oil (e.g., fluorine oil) is sealed in the pressure detecting chamber 90 to be used as a pressure transmission medium. Oil is filled and sealed in the pressure detecting chamber 90 to cover the sensor element 40 and an electrical connection member such as the wire 50. Further, the oil is covered and sealed by the metal diaphragm 80.

A circular recess 91 is formed around the pressure detecting chamber 90, and an O-ring 92 for air-tightly sealing the pressure detecting chamber 90 is disposed in the circular recess 91. The O-ring 92 is press-inserted between the first case 11 and the pressing member 81. Therefore, the pressure detecting chamber 90 is air-tightly sealed and closed by the metal diaphragm 80 and the O-ring 92.

Next, operation of the pressure sensor S1 for detecting the pressure will be now described. The pressure sensor S1 is attached to a pipe member of an air conditioner for a vehicle by the screw portion 72 of the housing 70 to communicate with an inner space of the pipe member. Refrigerant in the pipe member of the air conditioner is introduced into the pressure sensor S1 through the pressure introduction passage 71. Accordingly, the pressure of refrigerant in the air conditioner is applied from the metal diaphragm 80 to a surface of the sensor element 40 through the oil in the pressure detecting chamber 90. Then, an electrical signal corresponding to the applied pressure is output from the sensor element 40 as a sensor signal. The sensor signal is transmitted from the sensor element 40 to the wire 50, and is transmitted to an outside circuit through the terminals 20, so that the pressure of refrigerant in the air conditioner is detected.

In the pressure sensor S1, a noise current may be introduced from the outside of the case member 10 to the sensor element 40 through the terminals 20 and the wire 50. In the present embodiment, the chip capacitor 60 is mounted to the terminals 20 that are electrically connected with the sensor element 40, through the branch portions 21. Therefore, noise current affected to the sensor element 40 can be restricted. Specifically, the noise current from the outside is introduced to the sensor element 40, through the terminal 20 for the output signal Vout and the terminal 20 for the input signal Vcc. However, in the present embodiment, the chip capacitor 60 is placed between the sensor element 40 and the outside, for absorbing the noise current by the chip capacitor 60. Accordingly, in this embodiment, the resistance of EMC can be improved.

Next, a manufacturing method of the pressure sensor S1, for manufacturing the pressure sensor will be now described with reference to FIGS. 5–8.

First, the first case 11 shown in FIG. 2 and FIG. 3A is prepared. In the first case 11 shown in FIG. 2 and FIG. 3A, the terminals 20 are integrally molded by insert molding. Then, the chip capacitor 60 is mounted on the second surface 11b of the first case 11, and the chip capacitor 60 and the exposed portion 22 are electrically connected by Ag paste or solder. This state is shown in FIGS. 4A and 4B.

Figure 5:
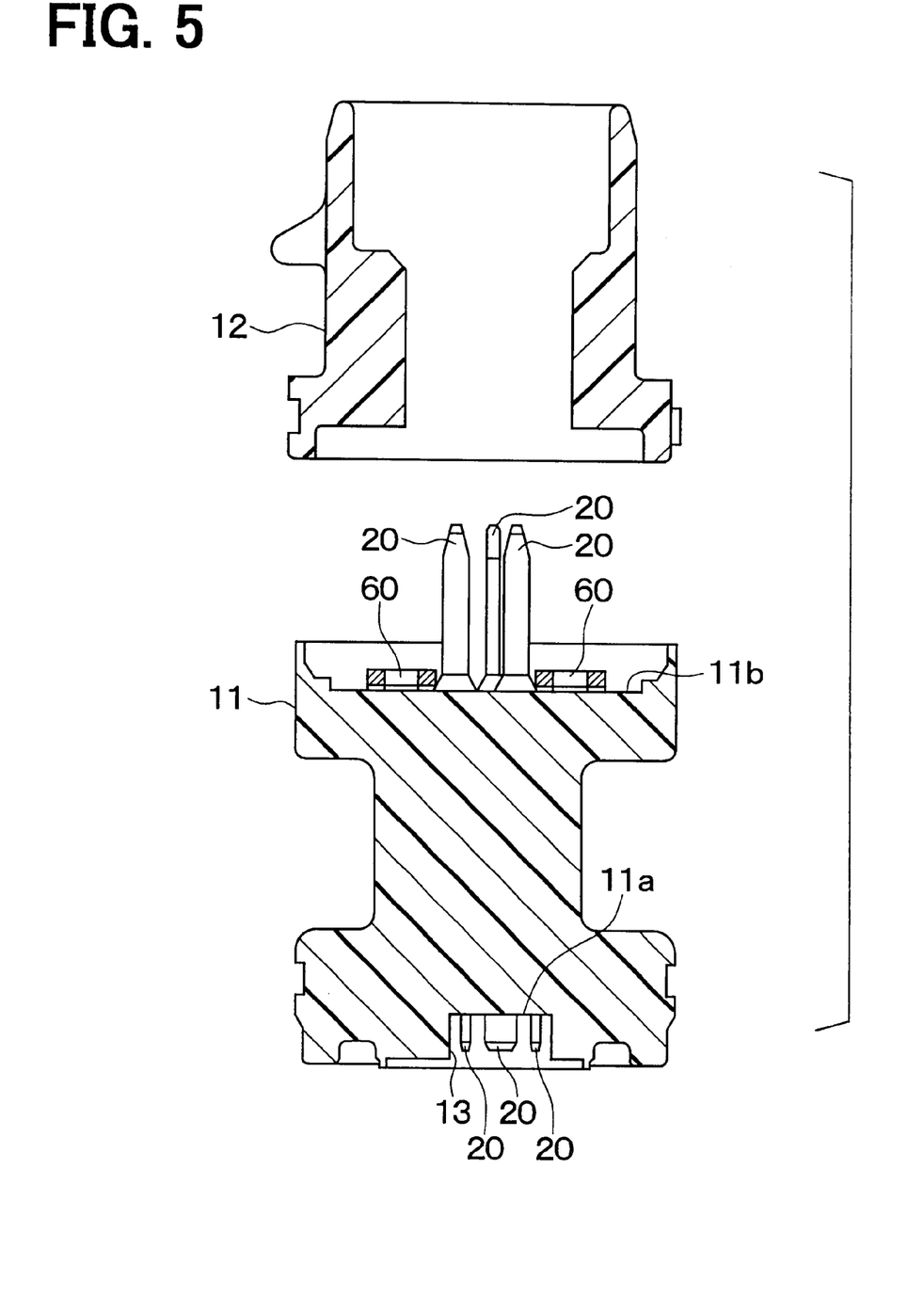
FIG. 5 is a schematic sectional view for showing a forming step for manufacturing the pressure sensor in FIG. 1.
Figure 6:
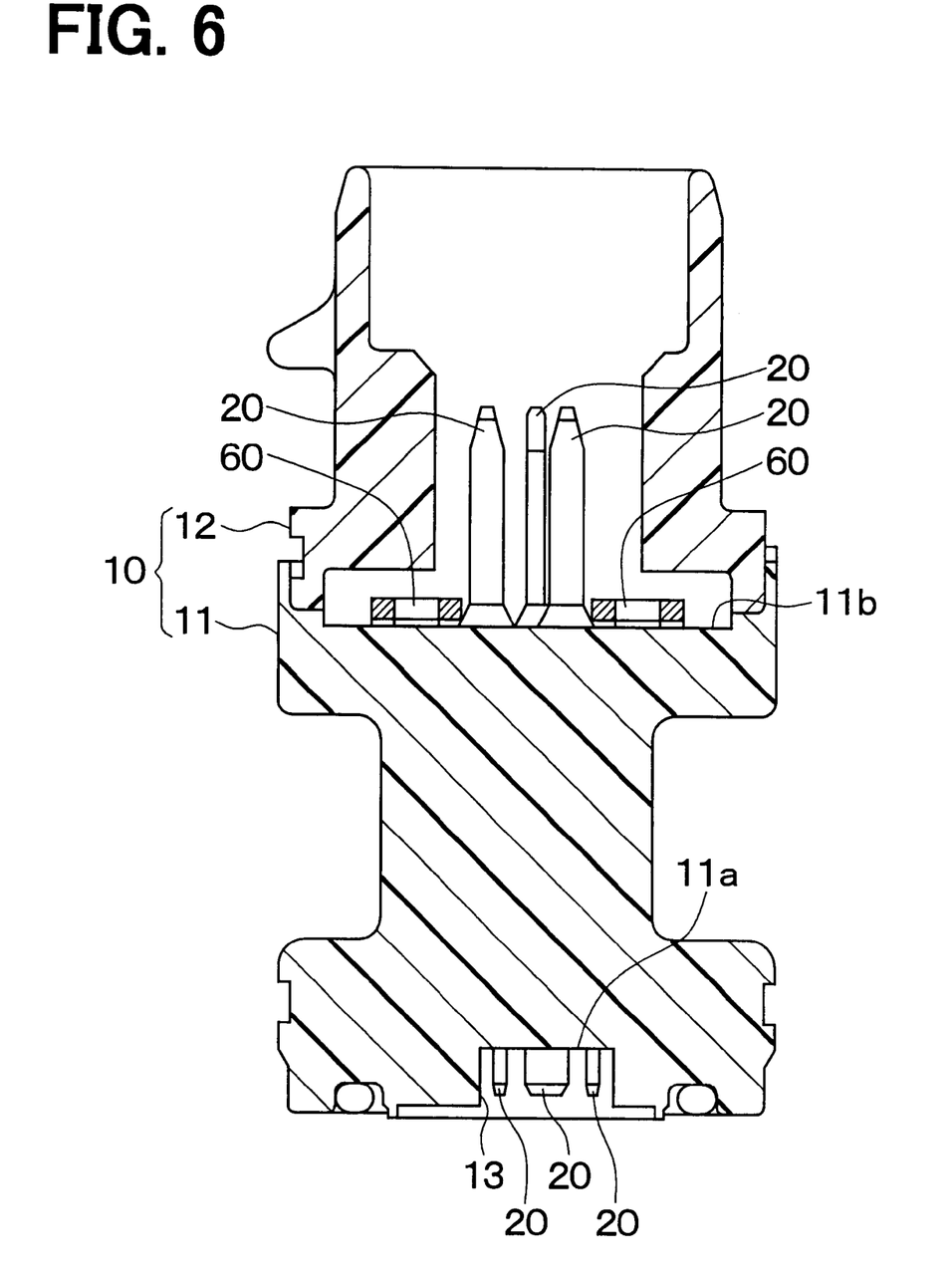
FIG. 6 is a schematic sectional view for showing a forming step after the step in FIG. 5.

Next, as shown in FIGS. 5 and 6, the first case 11 provided with the chip capacitors 60 and the second case 12 are assembled, and contact portions between the first case 11 and the second case 12 are supersonically melted. Accordingly, the case member 10 composed of the first and second cases 11 and 12 are formed as shown in FIG. 6.

Figure 7:
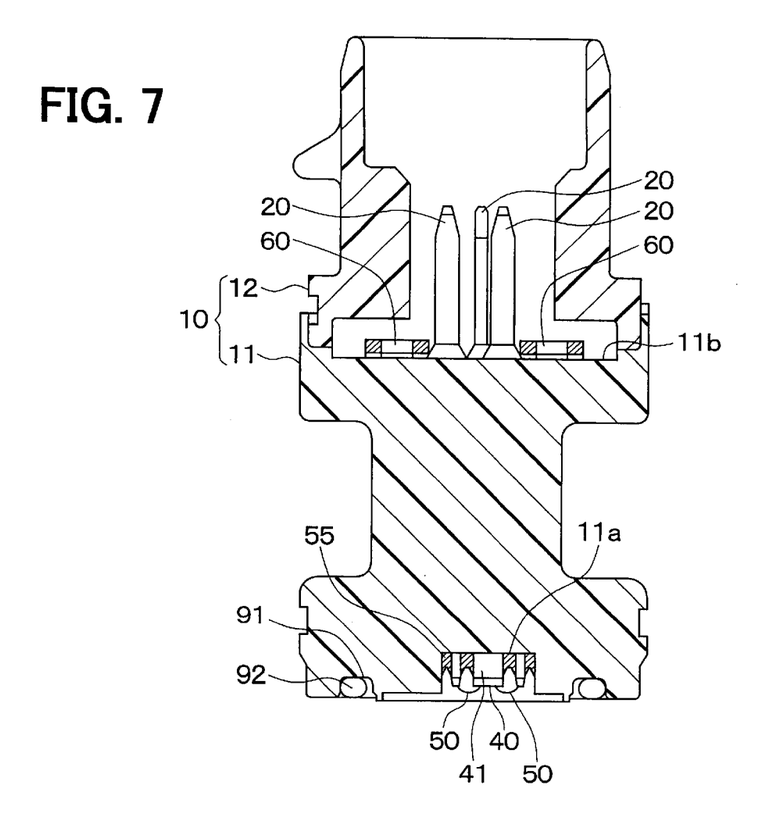
FIG. 7 is a schematic sectional view for showing a forming step after the step in FIG. 6.

Next, as shown in FIG. 7, the sensor element 40 is bonded and fixed to the first surface 11a, that is, the bottom surface of the recess portion 13 of the first case 11. Then, the seal material (adhesive) 55 is introduced, and the terminals 20 and the sensor element 40 are wire-connected by the wires 50 through wire-bonding. Further, the O-ring 92 is assembled. Then, the first case 11 is arranged so that the sensor element 40 is positioned at an upper side, and a predetermined amount of the oil is introduced into the recessed space of the first case 11 from an upper side of the first case 11 by a dispenser or the like.

Figure 8:
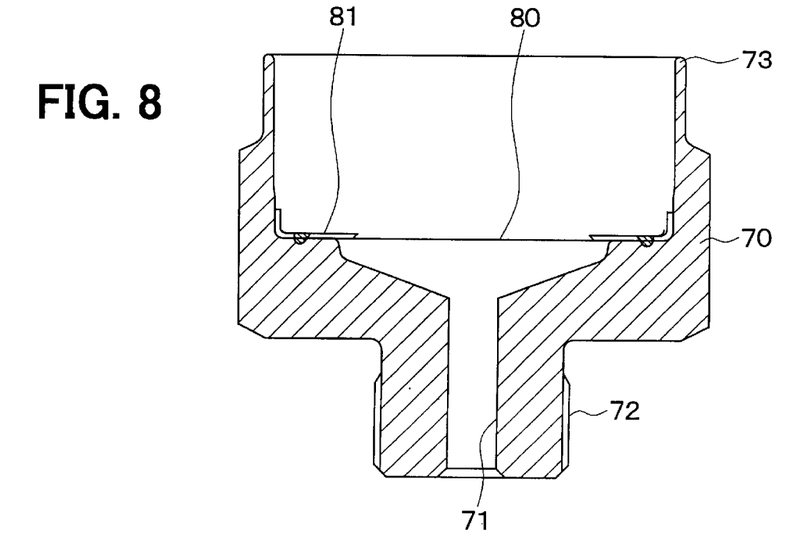
FIG. 8 is a schematic sectional view for showing a forming step for manufacturing the pressure sensor.

On the other hand, as shown in FIG. 8, all the peripheries of the pressing member 81 and the metal diaphragm 80 are melted to the housing 70, so that the pressing member 81 and the metal diaphragm 80 are integrated. While the horizontal state of the housing 70 is maintained from an upper side, the first case 11 is fitted into the housing 70. In this state, the first case 11 and the housing 70 moved to a vacuum chamber, and air in the pressure detecting chamber 90 is pumped to be removed.

Thereafter, the first case 11 and the housing 70 are pressed, so that the first case 11 and the pressing portion of the housing 70 contact sufficiently. Therefore, the pressure detecting chamber 90, sealed by the metal diaphragm 80 and the O-ring 92, is formed. Next, the end portion 73 of the housing 70 is bent to a radial inner side to be fastened to the first case 11, so that the case 10 and the housing 70 are integrated. Through the above-described manufacturing method, the pressure sensor S1 is formed.

According to the present embodiment, because the case member 10 is formed by combining the first case 11 and the second case 12, the mounting portion of the chip capacitor 60 in the first case 11 and the connector portion of the second case 12 can be independently molded. Therefore, the area of the second surface 11b that is an actual capacitor mounting surface can be readily increased regardless of the size or the shape of the second case 12 having the connector portion. Accordingly, the diameter D1 of the second surface 11b can be readily set larger than the diameter D2 of the connector portion of the second case-12.

Further, at least a part of the exposed portions 22 of the branch portions 21, exposed to the second surface 11b, can be disposed to a radial outer side from the diameter D2 of the connector portion of the second case 12. That is, the second case 12 has a cover surface 12a that covers a part of the second surface 11b of the first case 11 to have a predetermined distance between the cover surface 12a and the second surface 11b of the first case 11. Therefore, at least a part of the exposed portions 22 is covered by the cover surface 12a of the second case 12. Accordingly, in the pressure sensor S1 having the sensor element 40 and the terminals 20 for connecting the sensor element 40 to the outside, the chip capacitor 60 having a large capacity (large size) can be suitably assembled to the case 10 without changing the size or the shape of the connector portion.

Further, the chip capacitors 60 can be assembled to the exposed portions of the branch portions 21, while the base portions of the branch portions 21 are embedded in the first case 11 to be fixed in the first case 11. Therefore, the chip capacitor 60 can be readily assembled to the first case 11, while it can prevent the branch portions 21 from being deformed in the assembling. Because the terminals 20 and the branch portions 21 are tightly fixed to the first case 11, it can prevent the branch portions 11 from being deformed by vibration even when the second case 12 is supersonically melted.

Because the chip capacitor 60 is provided in the case 10, the capacity of the chip capacitor 60 can be set larger, as compared with a case where the chip capacitor 60 is provided in the sensor element 40. In addition, in this embodiment, the chip capacitor 60 is provided at an approximate middle portion of the case 10 in the axial direction, separately from the sensor element 40. Therefore, the shape and the size of the chip capacitor 60 can be freely set, without depending on the shape of the sensor element 40 and the inner shape of the second case 12. Accordingly, the size of the chip capacitor 60 can be more readily increased.

As shown in FIG. 1, the branch portions 21 are branched radial outside from axial portions of the terminals 20. Therefore, even when the terminals 20 are collectively provided, the mounting space for mounting the chip capacitor 60 can be readily provided.

Further, according to this embodiment, because the second surface 11b of the first case 11 is covered by the cover surface 12a of the second case 12, the chip capacitor 60 mounted on the second surface 11b can be covered by the cover surface 12a of the second case 12. Therefore, it can effectively restrict the chip capacitor 60 from being affected by introduction of debris (foreign matter). Because the supersonic-wave melting is performed, it is unnecessary to perform a resin seal for protecting the chip capacitor 60. However, in the present embodiment, for accurately protecting the chip capacitor 60, the chip capacitor 60 may be covered by resin or the like.

Although the present invention has been fully described in connection with the preferred embodiment thereof with reference to the accompanying drawings, it is to be noted that various changes and modifications will become apparent to those skilled in the art.

Figure 9:
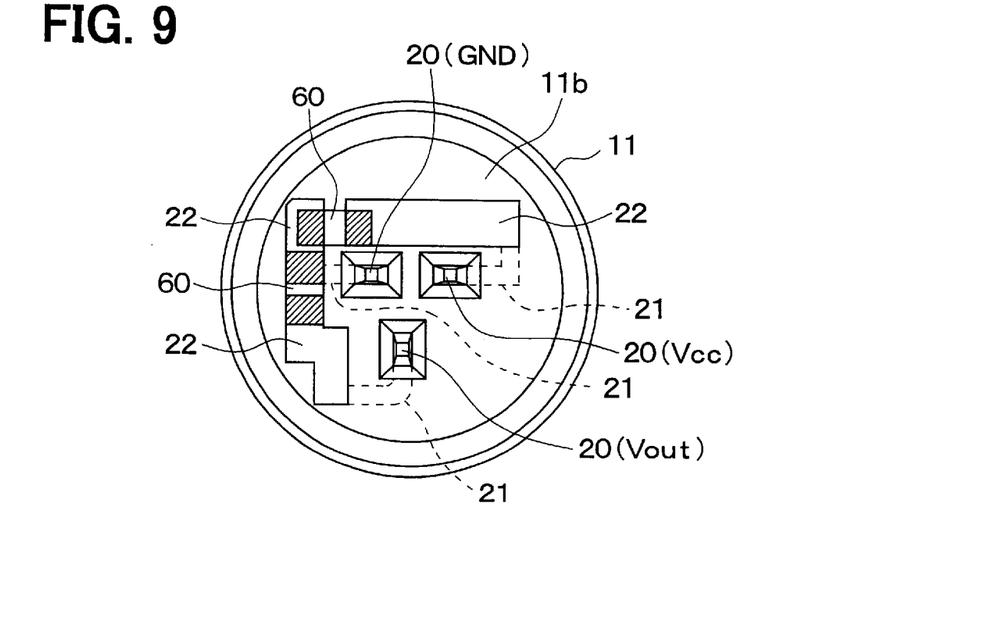
FIG. 9 is a schematic diagram showing a connection structure of a chip capacitor in a pressure sensor according to a modification of the present invention.

For example, in the above-described embodiment, the two chip capacitors 60 are mounted while the terminal 20 for the output signal Vout is used in common. However, as shown in FIG. 9, the two chip capacitors 60 can be mounted while the terminal 20 for the ground is used in common.

Such changes and modifications are to be understood as being within the scope of the present invention as defined by the appended claims.

What is claimed is:

1. A pressure sensor comprising:
a first case having a first surface, and a second surface opposite to the first surface;
a sensor element for detecting pressure, the sensor element being disposed in the first case on a side of the first surface;
a terminal embedded in the first case to be fixed in the first case, the terminal being electrically connected to the sensor element and an outside;
a second case having an inner wall surface defining an approximate cylindrical hollow portion, the second case being bonded to the first case to have a cover surface that cover at least a part of the second surface of the first case; and
a capacitor for restricting a noise current applied to the sensor element, wherein:
the terminal includes an extending portion extending in an axial direction in which the first case and the second case are connected;
the extending portion of the terminal protrudes from the second surface of the first case into the hollow portion of the second case in the axial direction to have a protrusion end being electrically connected to the outside;
the terminal includes a branch portion branched from the extending portion and embedded in the first case;
a part of the branch portion is exposed to the second surface to form an exposed portion;
the capacitor is disposed on the exposed portion to be electrically connected to the exposed portion; and
the second surface in the first case has a radial dimension that is larger than a radial dimension of the hollow portion at a predetermined position where the top end of the extending portion of the terminal is positioned.

2. The pressure sensor according to claim 1, wherein at least a part of the exposed portion is positioned at a radial outside of the radial dimension of the hollow portion at the predetermined position.

3. The pressure sensor according to claim 1, wherein the cover surface of the second case extends in a radial direction perpendicular to the axial direction to face the second surface of the first case and to have a predetermined clearance between the cover surface and the second surface.

4. A pressure sensor according to claim 1, wherein the terminal includes a plurality of terminal portions extending in the axial direction.

5. A pressure sensor comprising:
a first case having a first surface, and a second surface opposite to the first surface;
a sensor element for detecting pressure, the sensor element being disposed in the first case on a side of the first surface;
a terminal embedded in the first case to be fixed in the first case, the terminal being electrically connected to the sensor element and an outside;
a second case having an inner wall surface defining an approximate cylindrical hollow portion, the second case being bonded to the first case to have a cover surface that cover at least a part of the second surface of the first case; and
a capacitor for restricting a noise current applied to the sensor element, wherein:
the terminal includes an extending portion extending in an axial direction in which the first case and the second case are connected;

the extending portion of the terminal protrudes from the second surface of the first case into the hollow portion in the axial direction to have a protrusion end being electrically connected to the outside;

the terminal includes a branch portion branched from the extending portion and embedded in the first case;

a part of the branch portion is exposed to the second surface to form an exposed portion;

the capacitor is disposed on the exposed portion to be electrically connected to the exposed portion; and at least a part of the exposed portion is disposed at a radial outside of a radial dimension of the hollow portion at a predetermined position where the top end of the extending portion of the terminal is positioned.

6. A method for manufacturing a pressure sensor, comprising molding integrally a first case with a terminal embedded in the first case that has a first surface and a second surface opposite to the first surface, the terminal protruding from the second surface;

mounting a capacitor on an exposed portion of a branch portion of the terminal, exposed on the second surface of the first case, the branching portion being branched from the terminal radial outside in the first case;

molding integrally a second case having an inner wall surface defining an approximate cylindrical hollow portion;

bonding the first case and the second case to each other in an axial direction, such that the terminal protrudes from the second surface into the hollow portion of the second case, and a part of the second surface of the first case is covered by a cover surface of the second case, extending in a radial direction; and fixing a sensor element in the first case at a side of the first surface, to be electrically connected to the terminal.

* * * * *